United States Patent [19]

Tominaga et al.

[11] Patent Number: 5,017,443
[45] Date of Patent: May 21, 1991

[54] BATTERY HOUSING DEVICE

[75] Inventors: Tomohisa Tominaga; Kazuichi Sato; Kouichi Otsuka; Toshiya Endo, all of Furukawa; Susumu Oikawa, Miyagi, all of Japan

[73] Assignee: Alps Electric Co., Ltd., Tokyo, Japan

[21] Appl. No.: 386,930

[22] Filed: Jul. 28, 1989

[30] Foreign Application Priority Data

Oct. 6, 1988 [JP] Japan ............................ 63-130438[U]

[51] Int. Cl.⁵ .......................................... H01M 2/10
[52] U.S. Cl. ................................................ 429/99
[58] Field of Search ................................ 429/100, 99

[56] References Cited

U.S. PATENT DOCUMENTS 3,085,127 4/1963 Loris .................................. 429/99
4,161,568 7/1979 Lund .................................. 429/99

FOREIGN PATENT DOCUMENTS 58-68665 5/1983 Japan .

Primary Examiner—Donald L. Walton
Attorney, Agent, or Firm—Guy W. Shoup; David W. Heid

[57] ABSTRACT

In a battery housing device including a case for receiving at least two batteries in a parallel condition, retaining means provided in the vicinity of one of inside surfaces of the case, and an electrode spring adapted to be retained by the retaining means, wherein positive and negative electrodes of the batteries are electrically connected to each other through the electrode spring. The electrode spring includes a spiral turn portion and an L-shaped portion continuing from a radially outermost turn of the spiral turn portion, and the retaining means comprises a retainer provided to stand from a bottom surface of the case in such a manner as to be opposed to the inside surface of the case with a predetermined gap defined between the retainer and the inside surface, a pocket provided at a lower portion of the inside surface and having a blind hole therein, and a rib provided on the inside surface at a position between the retainer and the pocket and having a recess at an upper end thereof, wherein when the electrode spring is retained to the case, a lower portion of the spring turn portion is inserted into the predetermined gap between the retainer and the inside surface, and a free end of the L-shaped portion is inserted into the blind hole of the pocket, and a connecting portion between the spiral turn portion and the L-shaped portion is inserted into the recess of the rib.

1 Claim, 4 Drawing Sheets

BATTERY HOUSING DEVICE

BACKGROUND OF THE INVENTION

The present invention relates to a battery housing device for use with various electronic instruments, and more particularly to a fixing structure for an electrode spring for electrically connecting positive and negative electrodes of a pair of batteries.

FIGS. 4 to 6 show such a battery housing device in the prior art, wherein FIG. 4 is an elevational view of the battery housing device; FIG. 5 is a plan view of FIG. 4; and FIG. 6 is an exploded perspective view of FIG. 4.

Referring to FIGS. 4 to 6, reference numeral 11 designates a battery case formed of plastics and configured as a rectangular box having an upper opening for permitting insertion of batteries. Reference numeral 12 designates one of lateral inside surfaces of the battery case 11. A plurality of ribs 15, 16 and 17 for retaining an electrode spring 14 (which will be hereinafter described) is provided in the vicinity of the lateral inside surface 12. These ribs 15, 16 and 17 extend upwardly from a bottom surface 13 of the battery case 11. The rib 15 is opposed to the inside surface 12 with a predetermined gap defined therebetween. The rib 15 is formed at its upper portion with a pair of cutouts 15a and 15b. The rib 16 is located at a laterally central position between both the cutouts 15a and 15b in such a manner as to bridge the rib 15 and the inside surface 12. A pair of the ribs 17 are located at positions below the cutout 15b at predetermined intervals in such a manner as to bridge the rib 15 and the inside surface 12. The electrode spring 14 is composed of a spiral turn portion 14a, a straight portion 14b extending horizontally from the spiral turn portion 14a, and a curved portion 14c continuing from the straight portion 14b and curved in a substantially U-shaped configuration. The spiral turn portion 14a serves as a negative electrode contactor adapted to contact a negative electrode of a first battery (not shown), and the curved portion 14c serves as a positive electrode contactor adapted to contact a positive electrode of a second battery (not shown) to be arranged aside the first battery.

In mounting the electrode spring 14 into the battery case 11, the spring 14 is inserted from the upper opening of the case 11 into the gap defined between the inside surface 12 and the rib 15. That is, a radially outermost turn of the spiral turn portion 14a is inserted into a space defined by the inside surface 12, the rib 15 and the rib 16, and is retained at three positions, i.e., opposite side edges and a lower end thereof by the inside surface 12 and the rib 15. The straight portion 14b is inserted into an upper recess 16a of the rib 16, and is retained by the inside surface 12 and the rib 15. The curved portion 14c is inserted at its U-shaped lower portion into a space defined between both the ribs 17, and is retained by the inside surface 12 and the rib 15. An upper end of the curved portion 14c is also retained by the inside surface 12 and the rib 15.

When a pair of batteries (not shown) are housed into the battery case 11 and arranged in such a manner that the polarity is countered, a negative electrode of one of the batteries contacts a radially innermost turn of the spiral turn portion 14a projecting inwardly from the cutout 15a of the rib 15, and is biased by an elastic force of the spiral turn portion 14a. A positive electrode of the other battery contacts the curved portion 14c exposed from the cutout 15b of the rib 15, and is biased against the curved portion 14c by an elastic force of another electrode spring (not shown). Thus, both the batteries are electrically connected in series through the spring 14.

However, the conventional retaining structure includes a plurality of ribs in the vicinity of the inside surface 12 of the battery case 11, so as to retain the electrode spring 14. Accordingly, a mold for molding the battery case is complicated in structure. Especially in the case of molding the battery case as a part of a case for an electronic instrument rather than individualy molding the battery case, the mold structure is further complicated, causing the necessity of division of the mold or use of many movable cores. As a result, the mold is rendered expensive. Further, as the electrode spring is also complicated in shape, a machining cost is increased.

SUMMARY OF THE INVENTION

It is an object of the present invention to provide a battery housing device which may be manufactured at low costs.

According to the present invention, there is provided in a battery housing device including a case for receiving at least two batteries in a parallel condition, retaining means provided in the vicinity of one of inside surfaces of said case, and an electrode spring adapted to be retained by said retaining means, wherein positive and negative electrodes of said batteries are electrically connected to each other through said electrode spring; the improvement wherein said electrode spring comprises a spiral turn portion and an L-shaped portion continuing from a radially outermost turn of said spiral turn portion, and said retaining means comprises a retainer provided to stand from a bottom surface of said case in such a manner as to be opposed to said inside surface of said case with a predetermined gap defined between said retainer and said inside surface, a pocket provided at a lower portion of said inside surface and having a blind hole therein, and a rib provided on said inside surface at a position between said retainer and said pocket and having a recess at an upper end thereof, wherein when said electrode spring is retained to said case, a lower portion of said spring turn portion is inserted into said predetermined gap between said retainer and said inside surface, and a free end of said L-shaped portion is inserted into said blind hole of said pocket, and a connecting portion between said spiral turn portion and said L-shaped portion is inserted into said recess of said rib.

With this arrangement, the retaining means for retaining the electrode spring to the case may be made simple in shape, and a mold for molding the case may be accordingly made simple in structure. Further, as the electrode spring is also made simple in shape, a machining cost for the electrode spring may be reduced.

Objects and features of the invention will be more fully understood from the following detailed description and appended claims when taken with the accompanying drawings.

DETAILED DESCRIPTION OF THE PREFERRED EMBODIMENT

Figure 1:
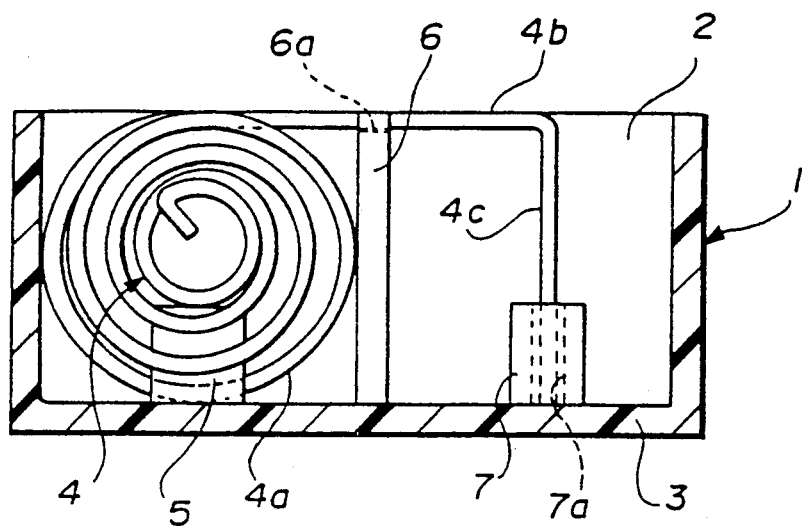
FIG. 1 is an elevational view of the battery housing device according to the present invention.
Figure 2:
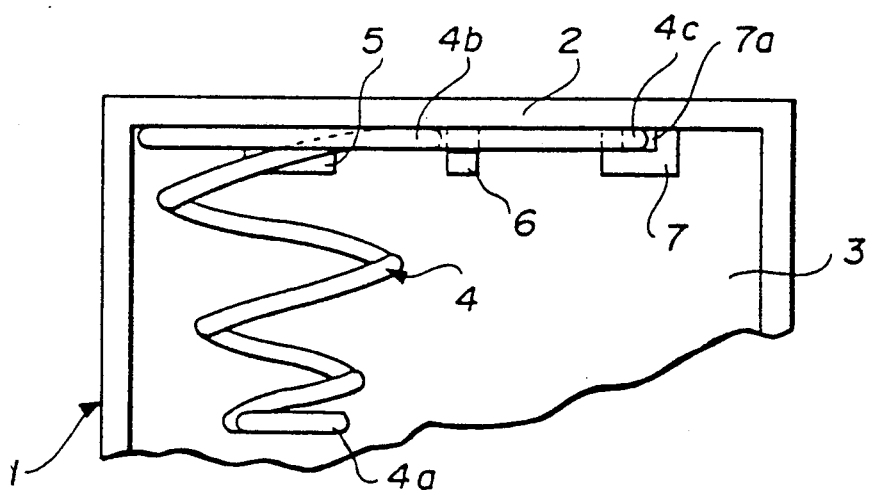
FIG. 2 is a plan view of FIG. 1.
Figure 3:
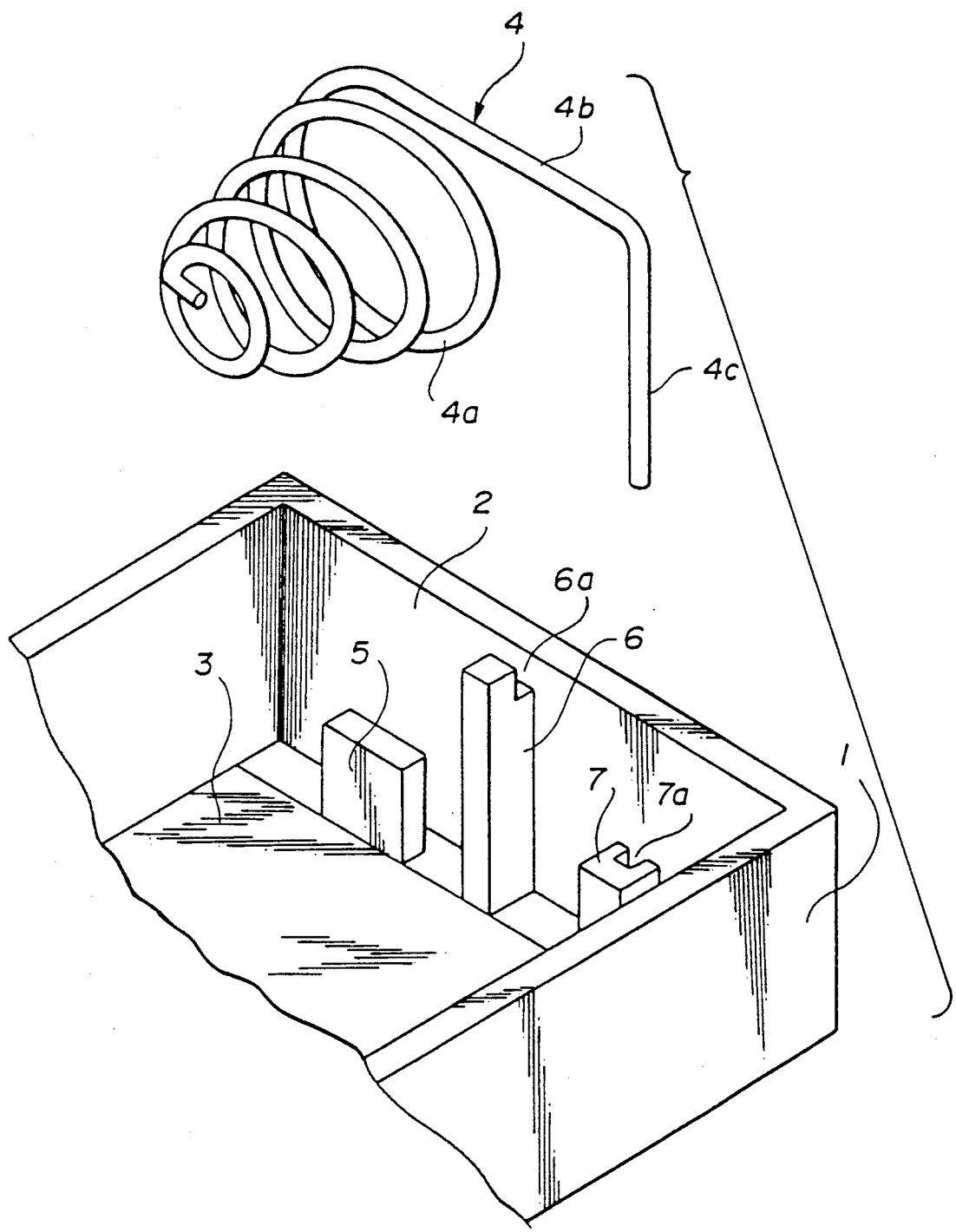
FIG. 3 is an exploded perspective view of FIG. 1.
Figure 4:
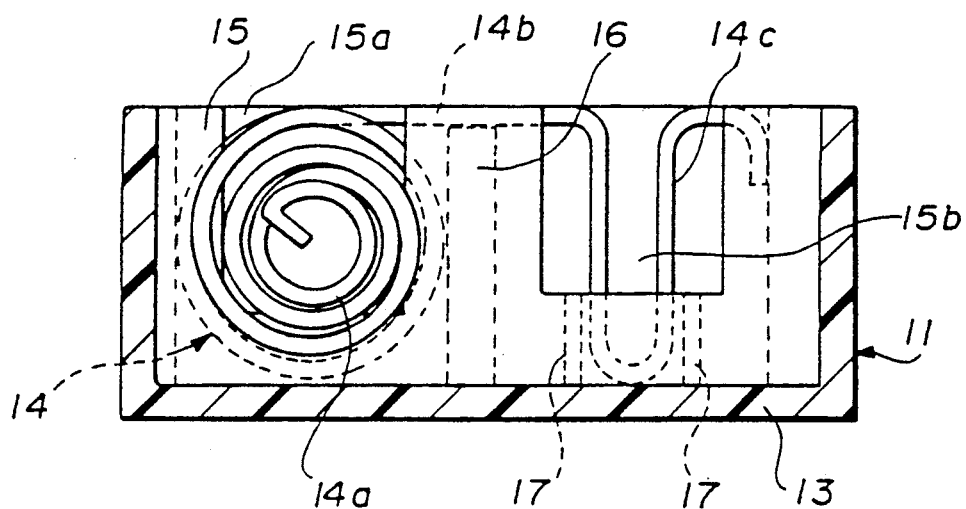
FIG. 4 is an elevational view of the battery housing device in the prior art.
Figure 5:
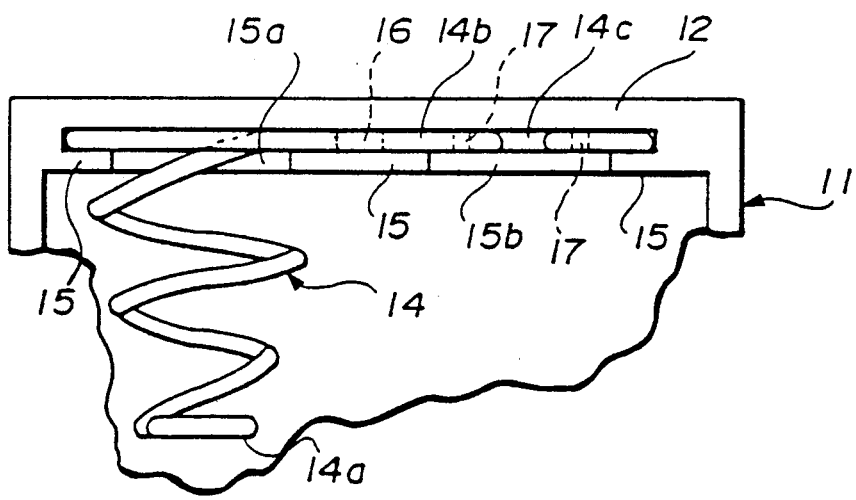
FIG. 5 is a plan view of FIG. 4.
Figure 6:
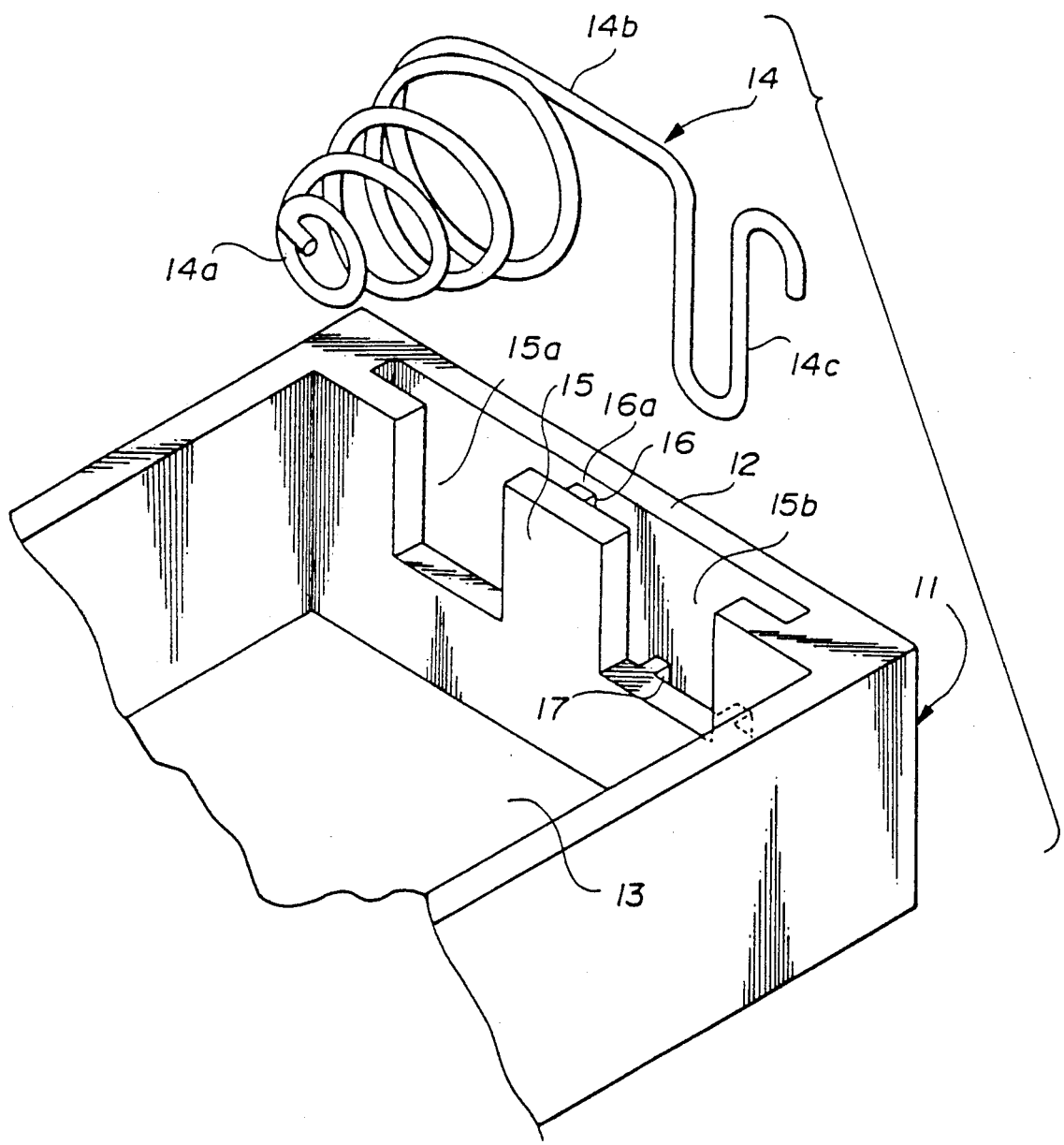
FIG. 6 is an exploded perspective view of FIG. 4.

Referring to FIGS. 1 to 3, reference numeral 1 generally designates a battery case formed of plastics and configured as a rectangular box having an upper opening for permitting insertion of batteries (not shown). Reference numerals 2 and 3 designate one of opposed lateral inside surfaces and a bottom surface of the battery case 1, respectively. A rib 6 is provided on the inside surface 2 at a laterally central position thereof in such a manner as to extend upwardly from the bottom surface 3 to the upper end of the inside surface 2. The rib 6 is formed at its upper end with a groove 6a. A tongue-like retainer 5 is provided to extend upwardly from the bottom surface 3 to a given height in such a manner that a predetermined gap is defined between the retainer 5 and the inside surface 2. A pocket 7 having a U-shaped configuration in plan is provided at a lower portion of the inside surface 2 in such a manner as to extend upwardly from the bottom surface 3 to a given height. The pocket 7 includes therein a blind hole 7a reaching the bottom surfaces 3. The retainer 5 and the pocket 7 are located in substantially symmetrical relationship to each other with respect to the rib 6.

Reference numeral 4 designates an electrode spring including a spiral turn portion 4a and an L-shaped portion continuing from the spiral turn portion 4a. The L-shaped portion includes a horizontal portion 4b extending from the radially outermost turn of the spiral turn portion 4a in a direction perpendicular to an axis thereof and a vertical portion 4c extending downwardly from the horizontal portion 4a. The spiral turn portion 4a serves as a negative electrode contactor, while the vertical portion 4c of the L-shaped portion serves as a positive electrode contactor.

In mounting the electrode spring 4 into the battery case 1, the spring 4 is inserted from the upper opening of the battery case 1 along the lateral inside surface 2 toward the bottom surface 3. That is, the radially outermost turn of the spriral turn portion 4a is lowered along the rib 6 and one of longitudinal inside surfaces 8, and a lower end of the radially outermose turn is inserted into the gap defined between the inside surface 2 and the retainer 5. Simultaneously, the lower end of the vertical portion 4c of the L-shaped portion is inserted into the blind hole 7a of the pocket 7, and the horizontal portion 4b is inserted into the groove 6a of the rib 6. Accordingly, the spring 4 is retained at three positions by the retainer 5, the upper end of the rib 6 and the pocket 7.

In other words, the retaining means for retaining the spring 4 consists of only the three elements, that is, the retainer 5, the rib 6 and the pocket 7. As the three elements are simple in shape, a mold for molding the battery case 1 may be made simple in structure, thereby reducing the associated cost. Furthermore, as the spring 4 has a simple structure including only the spiral turn portion 4a and the L-shaped portion, a matching cost for the spring 4 may be reduced. Thus, the total cost may be reduced.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. In a battery housing device including a case for receiving at least two batteries in a parallel condition, retaining means provided in the vicinity of one of the inside surface of an end wall of said case, said end wall being laterally adjoined on opposite sides by first and second side walls, and an electrode spring adapted to be retained by said retaining means, wherein positive and negative electrodes of said batteries are electrically connected to each other through said electrodes spring, the improvement wherein said electrode spring comprises a spiral turn portion and an L-shaped portion continuing from a radially outermost turn of said spiral turn portion, and said retaining means comprises:

a retainer provided to stand from a bottom surface of said case in such a manner as to be separated from said first and second side walls and opposed to said end wall of said case with a predetemined gap defined between said retainer and said end wall;

a pocket is provided at a lower portion of said end wall, said pocket having a blind hole therein; and a rib is provided on said end wall at a position between said retainer and said pocket, said rib having a recess at an upper end thereof;

wherein when said electrode spring is retained to said case, a lower portion of said spring turn portion is inserted into said predetermined gap qetween said retainer and said end wall, and a free end of said L-shaped portion is inserted into said blind hole of said pocket, and a connecting portion between said spiral turn portion and said L-shaped portion is inserted into said recess of said rib.

* * * * *